(12) United States Patent
Oba

(10) Patent No.: US 10,298,821 B2
(45) Date of Patent: *May 21, 2019

(54) LENS MOUNTING MECHANISM, LENS MOUNTING METHOD, AND IMAGE PICKUP DEVICE

(71) Applicant: Sony Corporation, Tokyo (JP)

(72) Inventor: Eiji Oba, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,462

(22) Filed: Nov. 28, 2017

(65) Prior Publication Data

US 2018/0338073 A1    Nov. 22, 2018

Related U.S. Application Data

(63) Continuation of application No. 15/185,871, filed on Jun. 17, 2016, now Pat. No. 9,888,157, which is a
(Continued)

(30) Foreign Application Priority Data

Jul. 31, 2012    (JP) .................................. 2012-170054

(51) Int. Cl.
*H04N 5/225*    (2006.01)
*G02B 7/02*    (2006.01)
(Continued)

(52) U.S. Cl.
CPC ........... *H04N 5/2254* (2013.01); *B32B 37/12* (2013.01); *B32B 37/142* (2013.01); *G02B 7/023* (2013.01);
(Continued)

(58) Field of Classification Search
CPC ...... H04N 5/2254; G02B 7/025; G02B 7/023; G02B 17/08; G02B 7/026; G02B 13/001;
(Continued)

(56) References Cited

U.S. PATENT DOCUMENTS 6,507,700 B1    1/2003    Takekuma et al.
7,670,064 B2    3/2010    Frenzel
(Continued)

FOREIGN PATENT DOCUMENTS

CN    101443687 A    5/2009
DE    102009055083 S1    6/2011
(Continued)

OTHER PUBLICATIONS

Japanese Office Action dated Dec. 19, 2017 for corresponding Japanese Application No. 2016-234854.
(Continued)

*Primary Examiner* — Twyler L Haskins
*Assistant Examiner* — Angel L Garces-Rivera
(74) *Attorney, Agent, or Firm* — Michael Best & Friedrich LLP

(57) ABSTRACT

A camera module system for a vehicle, an image pickup device, and a method. The camera module system including a lens holder, a case, a first engaging part, and a second engaging part. The lens holder is configured to mount a lens, the lens holder having a first surface that is perpendicular to an optical axis of the lens. The case is configured to mount the lens holder, the case having a second surface that faces the first surface. The first engaging part is on the first surface, the first engaging part including a plurality of first projections. The second engaging part is on the second surface, the second engaging part including a plurality of second projections. The first engaging part is engaged with the second engaging part when the plurality of first projections is engaged with the plurality of second projections.

20 Claims, 9 Drawing Sheets

Related U.S. Application Data continuation of application No. 14/406,771, filed as application No. PCT/JP2013/065567 on Jun. 5, 2013, now Pat. No. 9,386,204.

(51) Int. Cl.

| | | |
|---|---|---|
| *B32B 37/12* | (2006.01) | |
| *B32B 37/14* | (2006.01) | |
| *G02B 13/00* | (2006.01) | |
| *G03B 17/08* | (2006.01) | |
| *G03B 17/12* | (2006.01) | |
| *G02B 17/08* | (2006.01) | |

(52) U.S. Cl.
CPC ............. *G02B 7/025* (2013.01); *G02B 7/026* (2013.01); *G02B 13/001* (2013.01); *G02B 17/08* (2013.01); *G03B 17/08* (2013.01); *G03B 17/12* (2013.01); *B32B 2551/00* (2013.01)

(58) Field of Classification Search
CPC ........ G03B 17/08; G03B 17/12; B32B 37/12; B32B 37/142; B32B 2551/00
See application file for complete search history.

(56) References Cited

U.S. PATENT DOCUMENTS

| | | | |
|---|---|---|---|
| 8,063,982 B2 | 11/2011 | Kim et al. | |
| 8,130,315 B2 | 3/2012 | Kinoshita | |
| 9,888,157 B2 * | 2/2018 | Oba | G02B 7/026 |
| 2007/0145254 A1 | 6/2007 | Chen | |
| 2008/0100934 A1 | 5/2008 | Webster et al. | |
| 2009/0251800 A1 | 10/2009 | Iwai | |

FOREIGN PATENT DOCUMENTS

| | | |
|---|---|---|
| JP | 04-003409 A | 1/1992 |
| JP | 2002-090603 A | 3/2002 |
| JP | 2003-131112 A | 5/2003 |
| JP | 2004-133358 A | 4/2004 |
| JP | 2005-208373 A | 8/2005 |
| JP | 2006-308987 A | 11/2006 |
| JP | 2007-101737 A | 4/2007 |
| JP | 2008-046169 A | 2/2008 |
| JP | 2009-294540 A | 12/2009 |
| JP | 2012-113185 A | 6/2012 |
| JP | 2013-205782 A | 10/2013 |

OTHER PUBLICATIONS

International Search Report; International Application No. PCT/JP2013/065567; Filed: Jun. 5, 2013. (Form PCT/ISA/210).
PCT Written Opinion of the International Searching Authority; International Application No. PCT/JP2013/065567; dated Jul. 9, 2013. (Form PCT/ISA/220 and PCT/ISA/237).
Extended European Search Report dated Jan. 27, 2016 for corresponding European Application No. 13 82 5632.6.
Chinese Office Action dated Jun. 1, 2016 for corresponding Chinese Application No. 201380039294.2.
Japanese Office Action dated Aug. 30, 2016 for corresponding Japanese Application No. 2014-528034.

* cited by examiner

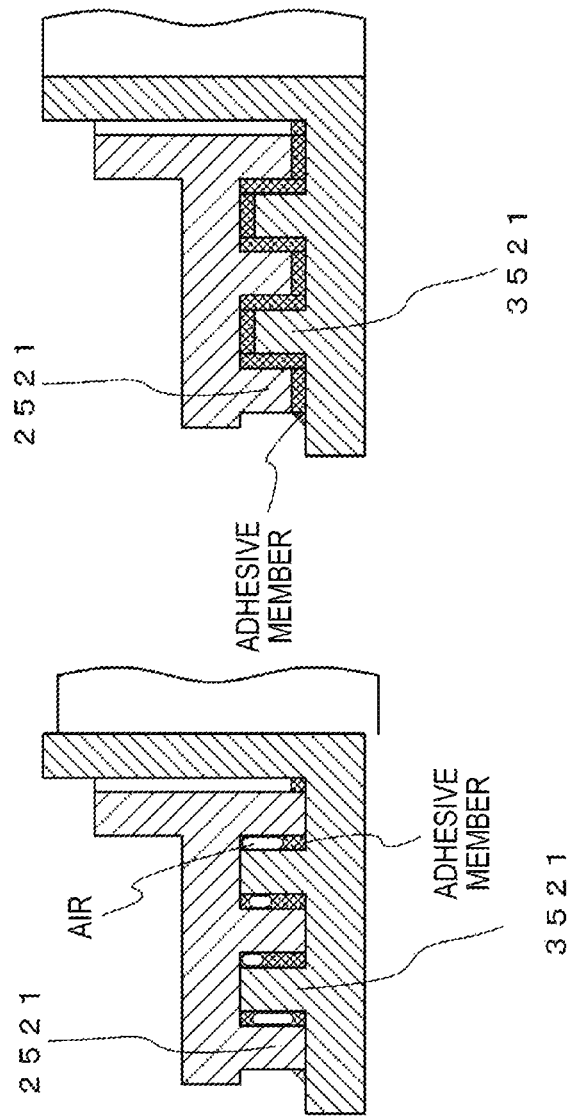

LENS MOUNTING MECHANISM, LENS MOUNTING METHOD, AND IMAGE PICKUP DEVICE

CROSS REFERENCES TO RELATED APPLICATIONS

The present application is a Continuation Application of U.S. patent application Ser. No. 15/185,871, filed Jun. 17, 2016, which is a Continuation Application of U.S. patent application Ser. No. 14/406,771, filed on Dec. 10, 2014, now U.S. Pat. No. 9,386,204, issued Jul. 5, 2016, which is a 371 National Stage Entry of International Application No.: PCT/JP2013/065567, filed on Jun. 5, 2013, and which claims priority to Japanese Patent Application No. 2012-170054, filed with the Japan Patent Office on Jul. 31, 2012, the entire contents of these applications are incorporated herein by reference.

TECHNICAL FIELD

The present technique relates to a lens mounting mechanism, a lens mounting method, and an image pickup device. In particular, an image pickup lens can be precisely mounted at a desired position.

BACKGROUND ART

Conventionally, an image pickup device having an image pickup lens and an image sensor such as a charge coupled device (CCD) and a complementary metal oxide semiconductor (CMOS) has been widely applied to a vehicle-mounted camera.

The image pickup device has the image sensor positioned at an imaging position of the image pickup lens and stored in a case. Also, the image sensor, a circuit, and the like in the case are protected from water, dust, and the like by giving the airtightness to the image pickup device. The image pickup device is fixed to a reference plane of a vehicle body of an object to be mounted, and used.

In order to obtain the airtightness for the image pickup device, the image pickup device is stored, for example, in a waterproof case in which an aperture part on an objective side of the front surface is sealed with plane glass. However, when an angle of view of the image pickup device stored in the waterproof case is wide, an angle of an incident light beam is constrained by the plane glass. Also, since it is necessary to use wide plane glass in order to ensure a wide angle of incidence, downsizing becomes difficult. Therefore, for example in Patent Document 1, a wide angle of view is ensured and miniaturization is performed by providing a lens barrel in which a second lens and a subsequent lens of a wide-angle lens group is fixed in the waterproof case by using the waterproof case. The aperture of the waterproof case is sealed by a first lens of the wide-angle lens group.

CITATION LIST

Patent Document

Patent Document 1: Japanese Patent Application Laid-Open No. 2002-90603

SUMMARY OF THE INVENTION

Problems to be Solved by the Invention

When a lens seals an aperture of a waterproof case, for example, an O-ring is used in Patent Document 1. FIG. 1 is an exemplary configuration of a case where airtightness is ensured by using the O-ring.

An exterior of an image pickup device 10 has a configuration in which a front case 21 and a rear case 22 are combined, and the rear case 22 is fixed on a vehicle and the like. An insertion hole 212, in which a lens holder 32 is inserted, is formed on a front part 211 of the front case 21. The lens holder 32 has the image pickup lens fixed therein. Also, an annular recess 213 is formed on a side of a case inner surface of the insertion hole 212.

An O-ring 41 is mounted on an outer peripheral side of the lens holder 32 in the insertion part 321, and the O-ring 41 is inserted into the insertion hole 212 of the front case 21. Also, the O-ring 41 mounted on the outer peripheral side is fit to the annular recess 213 of the insertion hole 212 by inserting the insertion part 321 of the lens holder 32 into the insertion hole 212.

Therefore, the lens holder 32 is fixed at a predetermined position relative to the front case 21 by inserting the insertion part 321 of the lens holder 32 into the insertion hole 212 of the front case 21. Also, since the O-ring 41 intervenes between the annular recess 213 and the insertion part 321, the airtightness between the front case 21 and the lens holder 32 can be ensured.

An image sensor 51 is mounted on a substrate 52 and precisely fixed relative to an image forming surface and positioned corresponding to the optical axis of the image pickup lens via a lens mounting support 322 and the substrate 52 so as to maintain image forming performance.

Also, a processing circuit for performing signal processing of an image signal generated by the image sensor 51 is provided in a substrate 53, and the substrates 52 and 53 are electrically connected via the connector 54. Also, the substrate 52 is positioned relative to the substrate 53 by connecting the substrates 52 and 53 via the connector 54.

A substrate mounting part 55 is provided on an inner surface side of a housing of the rear case 22. The substrate mounting part 55 has the substrate 53 mounted thereon. Also, the substrate 53 is mounted on the substrate mounting part 55, and the position of the image sensor 51 relative to the rear case 22 is determined. The substrate 53 is connected to a wiring member 56, for example, flexible printed circuits (FPC), to connect an external device.

In this way, when the airtightness is ensured by intervening the O-ring 41 between the front case 21 and the lens holder 32, the lens holder 32 is fixed at a predetermined position relative to the front case 21. At this time, it is necessary to compress the O-ring at a desired compression rate and push the O-ring in the insertion hole 212 in order to ensure adequate water-proofing capability. Consequently, centering of the lens holder 32 is strongly performed relative to the annular recess 213. On the other hand, the substrates 52 and 53 are connected via the connector 54, and the substrate 53 is mounted on the substrate mounting part 55. This makes the image sensor 51 be fixed at the predetermined position relative to the rear case 22. Therefore, in a case where the component accuracy and assembly accuracy of the image sensor 51, the substrates 52 and 53, and the substrate mounting part 55 are not high, position deviation occurs when the mounting has been completed. Then, the unnecessary variation of the positions occurs, for example, between the optical axis of the image pickup lens held by the lens mounting support 322 and the image sensor 51.

In this technique, the image pickup lens can be precisely mounted with the airtightness at the desired position and the position deviation caused by cumulative tolerance of all the mounted components can be absorbed.

Solutions to Problems

A first aspect of the technique is a lens mounting mechanism including a lens holder configured to hold an image pickup lens and a case configured to have an insertion hole to which the lens holder is inserted. An insertion part for being inserted into the insertion hole of the case in an insertion direction which is an optical axis direction of the image pickup lens and a regulation part for regulating the insertion are formed in the lens holder. Engaging parts are provided on a surface opposed to the case of the regulation part of the lens holder and a surface opposed to the regulation part of the case, and the engaging parts are formed so that the position of the lens holder relative to the case can be adjusted in a state where the engaging part on the surface opposed to the case and the engaging part on the surface opposed to the regulation part are engaged with each other.

In this technique, the insertion part which is inserted into the insertion hole of the case in the insertion direction which is the optical axis direction of the image pickup lens and the regulation part for regulating the insertion are formed in the lens holder for holding the image pickup lens. Engaging parts are provided on a surface opposed to the case of the regulation part of the lens holder and a surface opposed to the regulation part of the case. For example, the projections are formed, surrounding the insertion part, in the engaging part on the surface opposed to the case, and the projections are formed, surrounding the insertion hole, in the engaging part on the surface opposed to the regulation part. Also, an interval of the projections of the engaging part on the surface opposed to the case is formed wider than that of the engaging part on the surface opposed to the regulation part, and an interval of the projections of the engaging part on the surface opposed to the regulation part is formed wider than that of the engaging part on the surface opposed to the case. The position of the lens holder relative to the case can be adjusted by forming the engaging parts in this way in a state where the engaging part on the surface opposed to the case and the engaging part on the surface opposed to the regulation part are engaged with each other. Then, the engaged region is bonded with the adhesive member, which also has a role of a filler, in an engaging state where the lens holder is positioned at a desired position. Also, a conduction groove is provided in the projection in a radial direction, and air and the like sealed between the projections is discharged to the outside of the engaged region via the conduction groove at the time of the engagement. The engaged region is filled with the adhesive member.

A second aspect of the technique is a lens mounting method including a process for inserting a lens holder, in which an insertion part inserted into an insertion hole of a case in an insertion direction which is an optical axis direction of an image pickup lens and a regulation part for regulating the insertion are formed, in the case having the insertion hole in which the lens holder for holding the image pickup lens is inserted formed therein, a process for engaging an engaging part provided on a surface opposed to the case in the regulation part of the inserted lens holder with an engaging part provided on a surface opposed to the regulation part in the case, a process for adjusting the position of the lens holder based on an image signal of an imaged image generated by an image sensor based on an optical image generated by the image pickup lens, and a process for bonding the engaging parts to each other in a state where the engaging parts are engaged at an adjusted position of the lens holder.

A third aspect of the technique is an image pickup device including a lens holder configured to hold an image pickup lens, a front case configured to have an insertion hole, formed therein, where the lens holder is inserted, a rear case configured to be combined with the front case, and an image sensor configured to be provided in the case in which the front case is combined with the rear case and generate an image signal of an imaged image based on an optical image generated by the image pickup lens. An insertion part for being inserted into the insertion hole of the front case in an insertion direction which is an optical axis direction of the image pickup lens and a regulation part for regulating the insertion are formed in the lens holder. Engaging parts are provided on a surface opposed to the front case of the regulation part of the lens holder and on a surface opposed to the regulation part of the front case. The engaging parts are formed so that the position of the lens holder relative to the case can be adjusted in a state where the engaging part of the surface opposed to the case and the engaging part on the surface opposed to the regulation part are engaged with each other, and the engaging parts are bonded to each other in a state where the image pickup lens is positioned at a desired position and a space between the engaging parts are filled with an adhesive member.

Effects of the Invention

According to this technique, the insertion part which is inserted into the insertion hole of the case in the insertion direction which is the optical axis direction of the image pickup lens and the regulation part for regulating the insertion are formed in the lens holder for holding the image pickup lens. Also, the insertion hole formed in a case to which the lens holder is mounted. The lens holder is inserted into the insertion hole. The engaging parts are provided on the surface opposed to the case of the regulation part of the lens holder and on the surface opposed to the regulation part of the case. The engaging parts are formed so that the position of the lens holder relative to the case can be adjusted in a state where the engaging part on the surface opposed to the case and the engaging part on the surface opposed to the regulation part have been engaged with each other. Therefore, when the engaging part of the lens holder and that of the case are engaged and the lens holder is fixed to the case, the image pickup lens can be precisely mounted at a desired position with the airtightness. The effects described herein are only exemplary and not limited, and an additional affect can be made.

BRIEF DESCRIPTION OF DRAWINGS

FIGS. 9(A) and 9(B) are diagrams for describing a state of an assembly when conduction grooves have been formed.

MODE FOR CARRYING OUT THE INVENTION

Embodiments of the present technique will be described below. The description will be in the following order.
1. Configuration of image pickup device
2. First embodiment of front case and lens holder
3. Second embodiment of front case and lens holder <1. Configuration of Image Pickup Device>

Figure 1:
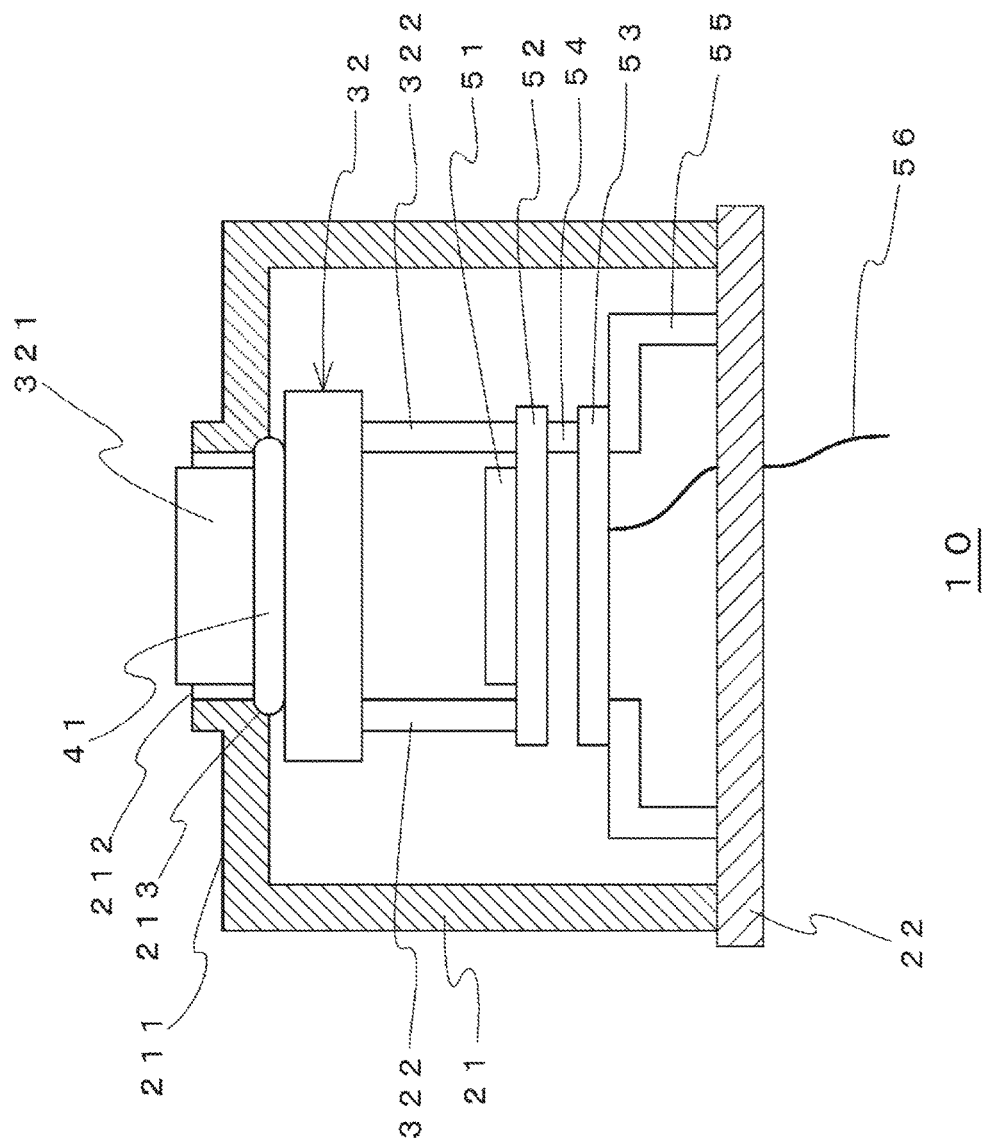
FIG. 1 is a diagram of an exemplary configuration of a case where airtightness is ensured by using an O-ring.
Figure 2:
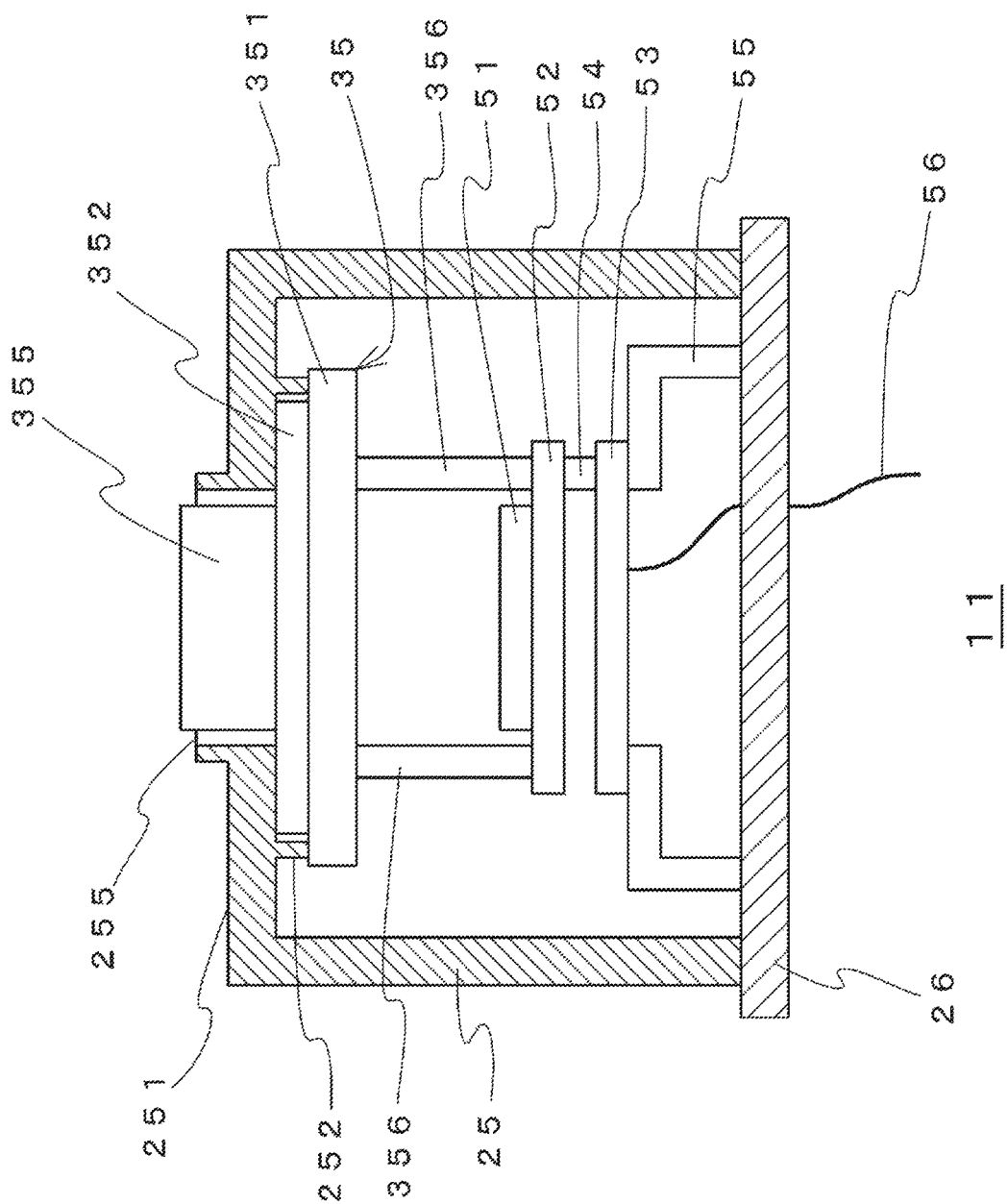
FIG. 2 is a diagram of an exemplary configuration of one embodiment of an image pickup device according to the present technique.

FIG. 2 is an exemplary configuration of one embodiment of an image pickup device for using a lens mounting mechanism according to the present technique. An exterior of an image pickup device 11 has a configuration in which a front case 25 and a rear case 26 are combined, and the rear case 26 is fixed on a vehicle and the like. Also, the front case 25 is combined with the rear case 26 so that the exterior of the image pickup device 11 has an airtight structure.

An insertion hole 255 is formed, for example, in a front part 251 of the front case 25. A lens holder 35 for holding an image pickup lens is inserted into the insertion hole 255. Also, an engaging part 252 is formed on an inner surface side of a case of the front part 251, that is, a surface opposed to a regulation part to be described.

In the lens holder 35, a regulation part 351 for regulating the insertion into the front case 25 and an insertion part 355 which is inserted into the insertion hole 255 of the front case 25 in an insertion direction which is an optical axis direction of the image pickup lens are formed. An engaging part 352 is formed on a surface opposed to the front case 25 in the regulation part 351.

The engaging part 252 can be engaged with the engaging part 352 when the insertion part 355 of the lens holder 35 is inserted into the insertion hole 255 of the front case 25. Also, when the engaging parts 252 and 352 have been engaged with each other, the position of the lens holder 35 relative to the front case 25, that is, the position of the optical axis of the image pickup lens held by the lens holder 35 has a gap of cumulative mounting tolerance, because the optical axis is uniquely adjusted and fixed relative to the image sensor as described below. The image pickup device 11 has a structure which can be hermetically sealed while absorbing arbitrary position deviation in the engaging parts.

When the insertion hole 255 is inserted into the insertion part 355 of the lens holder 35 and the engaging parts 252 and 352 are engaged with each other, the positions of the lens holder 35 is adjusted so that the optical axis of the image pickup lens is positioned at a predetermined position of the image sensor 51 to be described. After that, the engaging parts 252 and 352 are bonded to each other by using an adhesive member which also has a role of a filler, and the airtightness of the mounting part of the lens holder 35 is ensured.

The image sensor 51 is mounted on the substrate 52 and precisely fixed relative to an image forming surface and positioned corresponding to the optical axis of the image pickup lens via a lens mounting support 356 and the substrate 52 so as to maintain image forming performance. A processing circuit for performing signal processing of an image signal generated by the image sensor 51 is provided in the substrate 53, and the substrates 52 and 53 are electrically connected via the connector 54. Also, the substrate 52 is positioned relative to the substrate 53 by connecting the substrates 52 and 53 via the connector 54.

The substrate mounting part 55 is provided on the inner surface side of rear case 22. The substrate mounting part 55 has the substrate 53 mounted thereon.

Also, the substrate 53 is mounted on the substrate mounting part 55, and the position of the image sensor 51 relative to the rear case 22 is determined. The substrate 53 is connected to a wiring member 56, for example, flexible printed circuits (FPC), to connect an external device.

<2. First Embodiment of Front Case and Lens Holder>

Figure 3A:
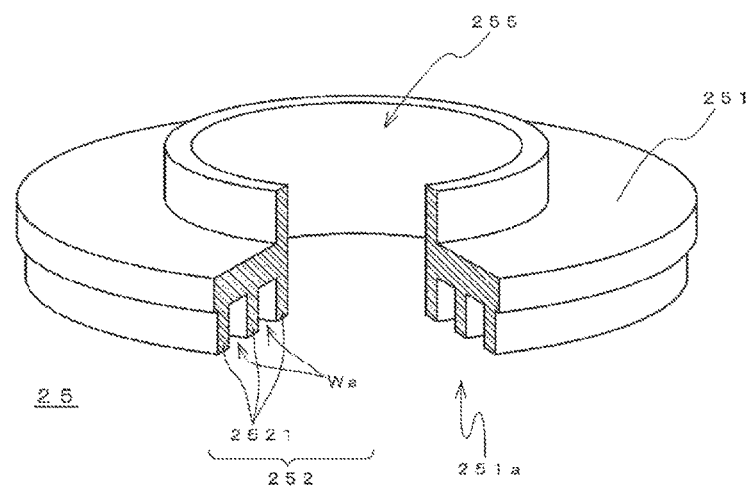
FIGS. 3(A) and 3(B) are views of a first embodiment of a front case and a lens holder.
Figure 3B:
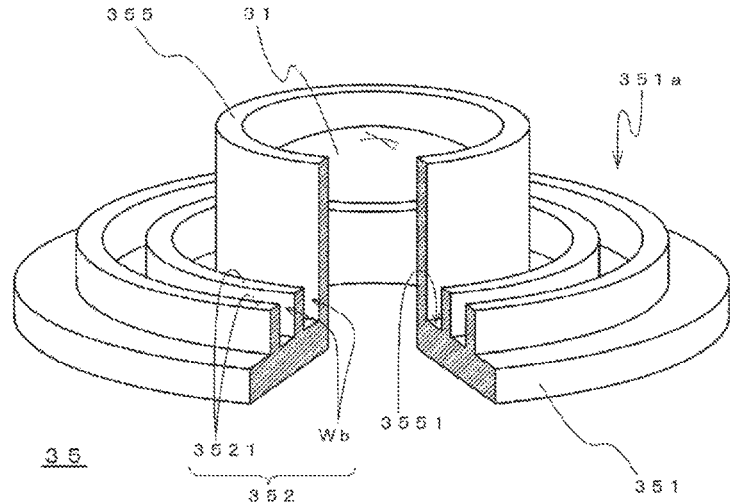

Next, a first embodiment of the front case and the lens holder will be described with reference to FIGS. 3(A) and 3(B). To simplify the description, the engaging part 252 and the insertion hole 255 in the front case 25 are illustrated in FIG. 3(A). Also, the lens holder 35 is illustrated in FIG. 3(B). In FIGS. 3(A) and 3(B), in order to clarify the shape of the engaging parts and the like, a part of the front case 25 and the lens holder 35 in a circumferential direction is cut off and a cross-section surface is illustrated (the same is applied to the perspective view to be described in the first embodiment). Also, an image pickup lens 31 is mounted in the lens holder 35 so that the central axis of the insertion part 355 substantially coincides with the optical axis of the image pickup lens 31. The image pickup lens 31 will be omitted in the following drawings.

The engaging part 252 is engaged with the engaging part 352 when the insertion part 355 of the lens holder 35 is inserted into the insertion hole 255 of the front case 25.

Projections 2521 are formed in the engaging part 252 on a surface opposed to a regulation part 251a, and the projections 2521 are formed surrounding the insertion hole 255, for example, in a ring shape and having the insertion hole 255 as the center. Also, projections 3521 are formed in the engaging part 352 on a surface opposed to the front case 351a, and projections 3521 are formed surrounding the insertion part 355, for example, in a ring shape and having the insertion part 355 as the center. That is, the engaging parts 252 and 352 are formed in a projected and recessed shape in a radial direction from the center of the insertion hole 255 and the insertion part 355. In addition, the engaging parts 252 and 352 are engaged by inserting the projections of one of the engaging parts between the projections of the other engaging part. For example, a distance between the center of the insertion hole 255 and the ring-shaped projection 2521 is set different from a distance between the center of the insertion part 355 and the ring-shaped projection 3521, and accordingly, the projections 2521 of the engaging part 252 are inserted between the projections 3521 of the engaging part 352. The plurality of projections 2521 and 3521 is formed in FIGS. 3(A) and 3(B). However, one or more projections can be provided.

In addition, an interval Wa of the projections 2521 of the engaging part 252 is formed wider than that of the projections 3521 of the engaging part 352, and an interval Wb of the projections 3521 of the engaging part 352 is formed wider than that of the projections 2521 of the engaging part 252 on the surface opposed to the regulation part 251a. When the engaging parts 252 and 352 are formed in this way, the position of the lens holder 35 can be adjusted relative to the front case 25 while the engaging part 252 has been engaged with the engaging part 352.

Also, when the engaging parts 252 and 352 are formed as indicated in FIGS. 3(A) and 3(B), an inner end of a boundary part between the insertion hole 255 and the insertion part 355 becomes a bottom surface 3551 of a region surrounded by the projection 3521 of the engaging part 352 and the insertion part 355 in a state where the insertion part 355 has been inserted into the insertion hole 255. Also, a distance from the inner end of the boundary part to the inside of the case becomes longer than that of a case where the engaging parts 252 and 352 are not formed, because the engaging parts 252 and 352 are formed in a projected and recessed shape. Therefore, entry of water and the like from the boundary part between the insertion hole 255 and the insertion part 355 can be effectively prevented by a long bonded part to the bottom surface 3551 and the inside of the case.

Figure 4A:
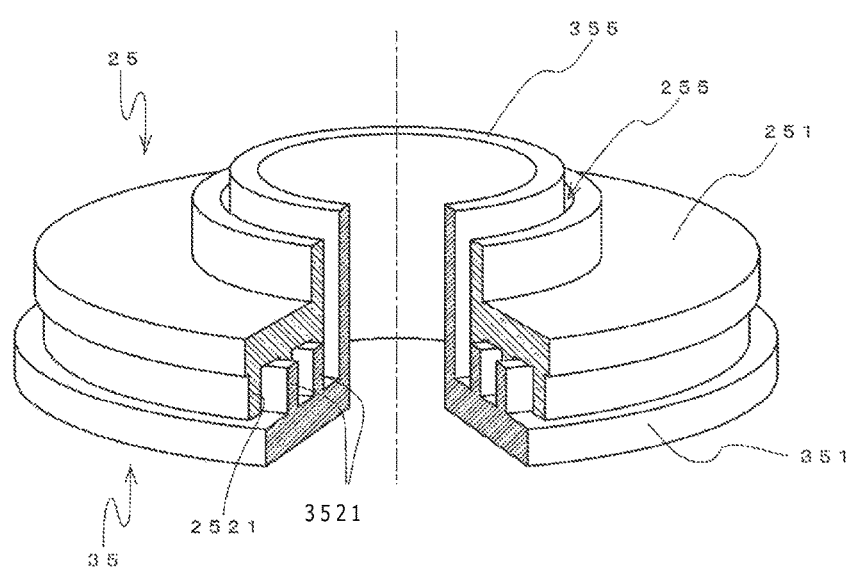
FIGS. 4(A) and 4(B) are views of a case where central axes of an insertion hole and the lens holder coincide with each other.
Figure 4B:
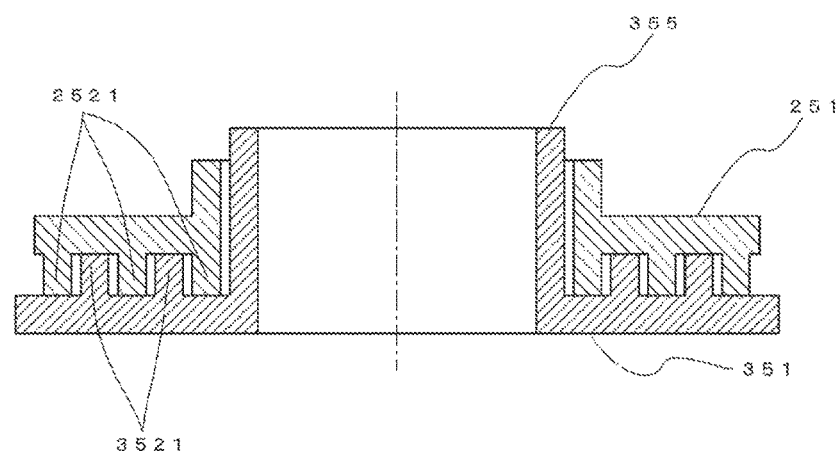

FIGS. 4(A) and 4(B) are views of a case where central axes of the insertion hole of the front case and the insertion part of the lens holder coincide with each other. FIG. 4(A) is a perspective view, and FIG. 4(B) is a cross-sectional view. An alternate long and short dash line indicates the central axes of the insertion hole 255 of the front case 25 and the insertion part 355 of the lens holder 35. A gap is generated between the insertion hole 255 and the insertion part 355 in a state where the central axes of the insertion hole 255 of the front case 25 and the insertion part 355 of the lens holder 35 coincide with each other and the insertion part 355 is inserted into the insertion hole 255. The gaps are also generated on both sides of the projections 2521 and 3521.

Therefore, the position of the lens holder 35 can be adjusted relative to the front case 25 in a state where the insertion part 355 has been inserted into the insertion hole 255 of the front case 25.

Figure 5A:
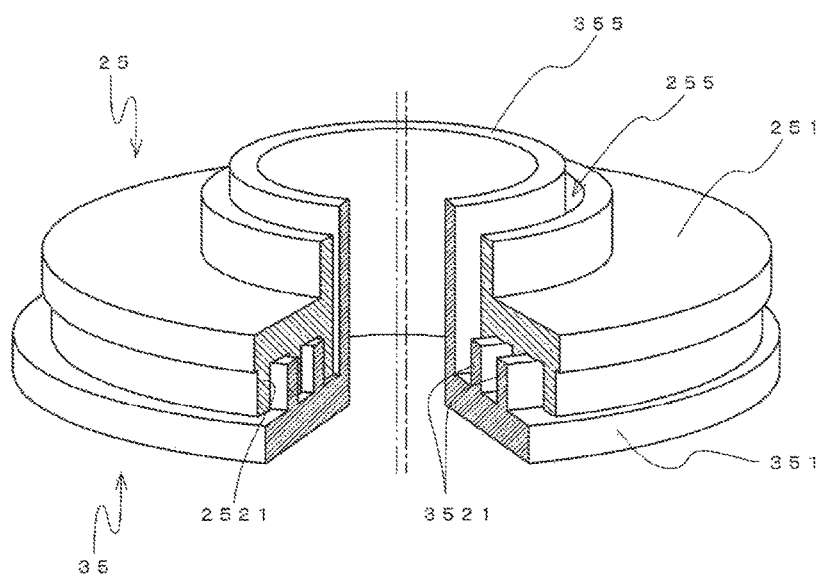
FIGS. 5(A) and 5(B) are views of a case where the position of the lens holder is moved in the left direction relative to the insertion hole.
Figure 5B:
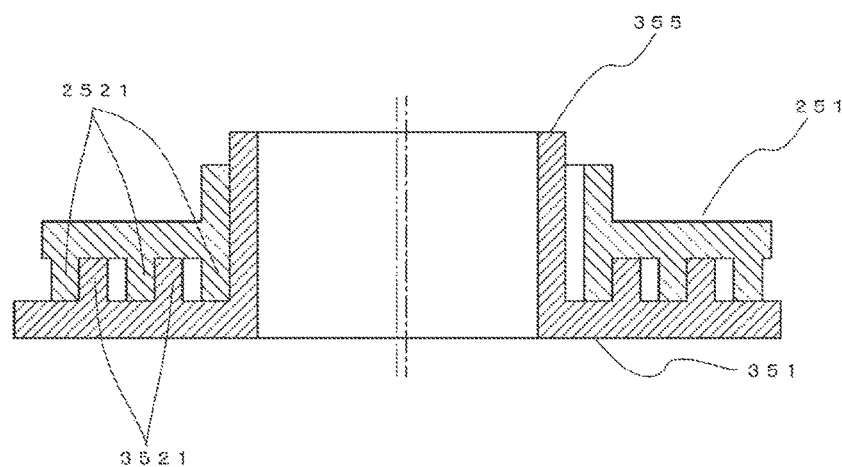

FIGS. 5(A) and 5(B) are views of a case where the position of the insertion part of the lens holder has moved in the left direction relative to the insertion hole of the front case. FIG. 5(A) is a perspective view, and FIG. 5(B) is a cross-sectional view. An alternate long and short dash line indicates the central axis of the insertion hole 255 of the front case 25, and an alternate long and two short dashes line indicates the central axis of the insertion part 355 of the lens holder 35. When the position of the insertion part 355 of the lens holder 35 has moved in the left direction, a left-side surface of the insertion part 355 contacts with the insertion hole 255. A right-side surface of the projection 2521 contacts with a left-side surface of the projection 3521.

Figure 6A:
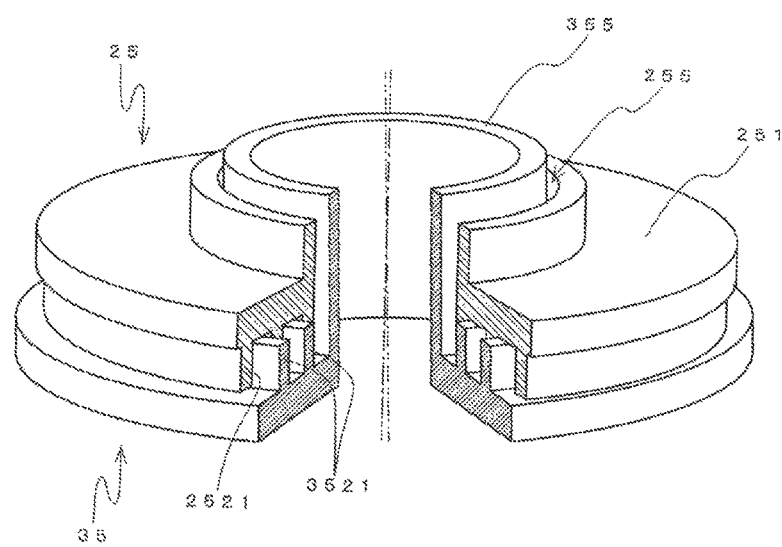
FIGS. 6(A) and 6(B) are views of a case where the central axis of the lens holder is inclined relative to the insertion hole.
Figure 6B:
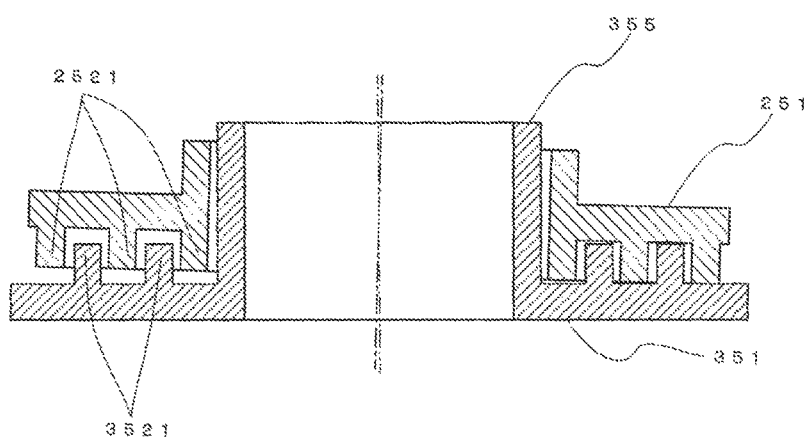

FIGS. 6(A) and 6(B) are views of a case where the insertion part of the lens holder is inclined relative to the insertion hole of the front case. FIG. 6(A) is a perspective view, and FIG. 6(B) is a cross-sectional view. An alternate long and short dash line indicates the central axis of the insertion hole 255 of the front case 25, and an alternate long and two short dashes line indicates the central axis of the insertion part 355 of the lens holder 35. When the central axis of the lens holder 35 has inclined, for example, in the left direction, the rightmost projection 2521 contacts with the regulation part 351 for example. Although the projections 2521 and 3521 in the left side has wider interval with a surface opposed to the projection, the engagement between the projections 2521 and 3521 is maintained.

In this way, the image pickup device 11 can adjust the position of the lens holder 35 relative to the front case 25 while the engaging part 252 of the front case 25 is engaged with the engaging part 352 of the lens holder 35. Therefore, the position (including tilt) of the lens holder 35 relative to the front case 25 is adjusted so that a gap of cumulative mounting tolerance is absorbed and the optical axis of the image pickup lens is positioned at a desired position.

Figure 7:
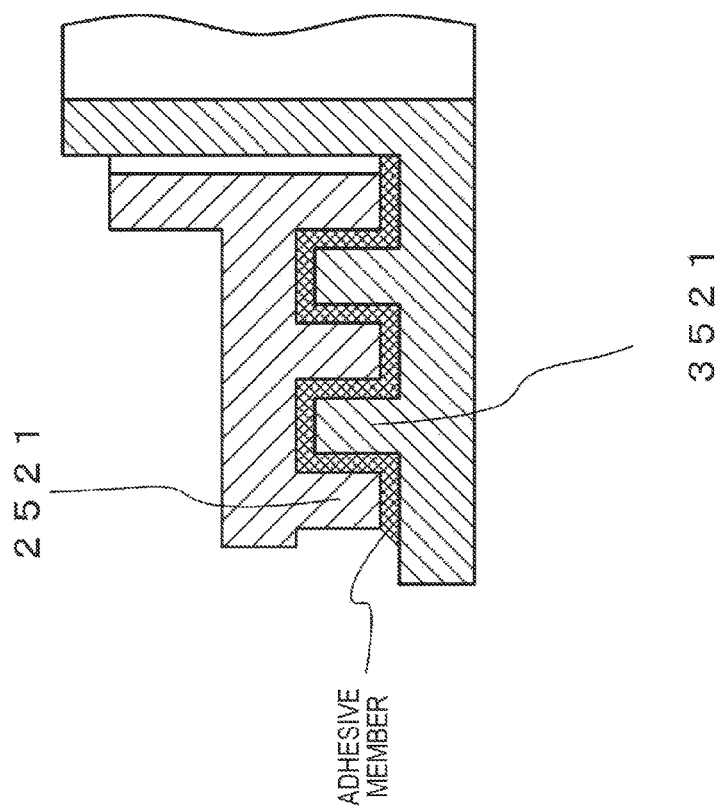
FIG. 7 is a diagram of a case where the lens holder is fixed on the front case at an adjusted position.

After that, the engaging parts are bonded to each other, in a state where they are engaged with each other, by using an adhesive member which also has a role of a filler. Then, the lens holder 35 is fixed to the front case 25 at the adjusted position as indicated in FIG. 7. As the adhesive member having the role of the filler, a naturally-cured fluid adhesive which cures as the time elapses may be used. Time necessary for curing may be shortened by using a fluid adhesive which cures by applying heat or irradiating with an ultraviolet ray.

The position of the lens holder 35 is adjusted based on an imaged image generated by the image sensor 51 according to an optical image. The optical image is generated by the image pickup lens held by the lens holder 35. That is, the position of the lens holder 35 is adjusted based on the imaged image so that the optical axis of the image pickup lens is positioned at the desired position. After that, the engaged region is bonded with the adhesive and the like at the adjusted position of the lens holder.

By mounting the image pickup lens in this way, the image pickup lens can be adjusted to the desired position even when the component accuracy and assembly accuracy of the image sensor 51, the substrates 52 and 53, and the substrate mounting part 55 of the image pickup device 11 are not high. Therefore, the assembling accuracy can be easily and inexpensively improved. Also, since the engaging part between the front case 25 and the lens holder 35 is filled with the adhesive and the like and bonded, the airtightness of the mounting part of the lens holder 35 can be ensured. In addition, the front case 25 is engaged with the lens holder 35 by providing the projections. Therefore, the entry of water and the like from the boundary part between the front case 25 and the lens holder 35 can be effectively prevented compared with a case where the engaging parts are not provided, that is, a case where the surface opposed to the regulation part of the front case 25 and the surface opposed to the front case of the lens holder 35 are bonded to each other with the adhesive member.

<3. Second Embodiment of Front Case and Lens Holder>

When the engaging part 252 of the front case 25 and the engaging part 352 of the lens holder 35 are engaged with each other and bonded to each other with the adhesive member having a role of a filler, the air sealed between the projections hardly escapes to the outside in a case where the projections are formed surrounding the insertion hole 255 of the front case 25 and the insertion part 355 of the lens holder 35. Therefore, there is a possibility that a space is generated in the bonded part and deterioration of the airtightness of the bonded part and the like occurs. In the second embodiment, a structure which can prevent the deterioration of the airtightness of the bonded part and the like will be described.

Figure 8:
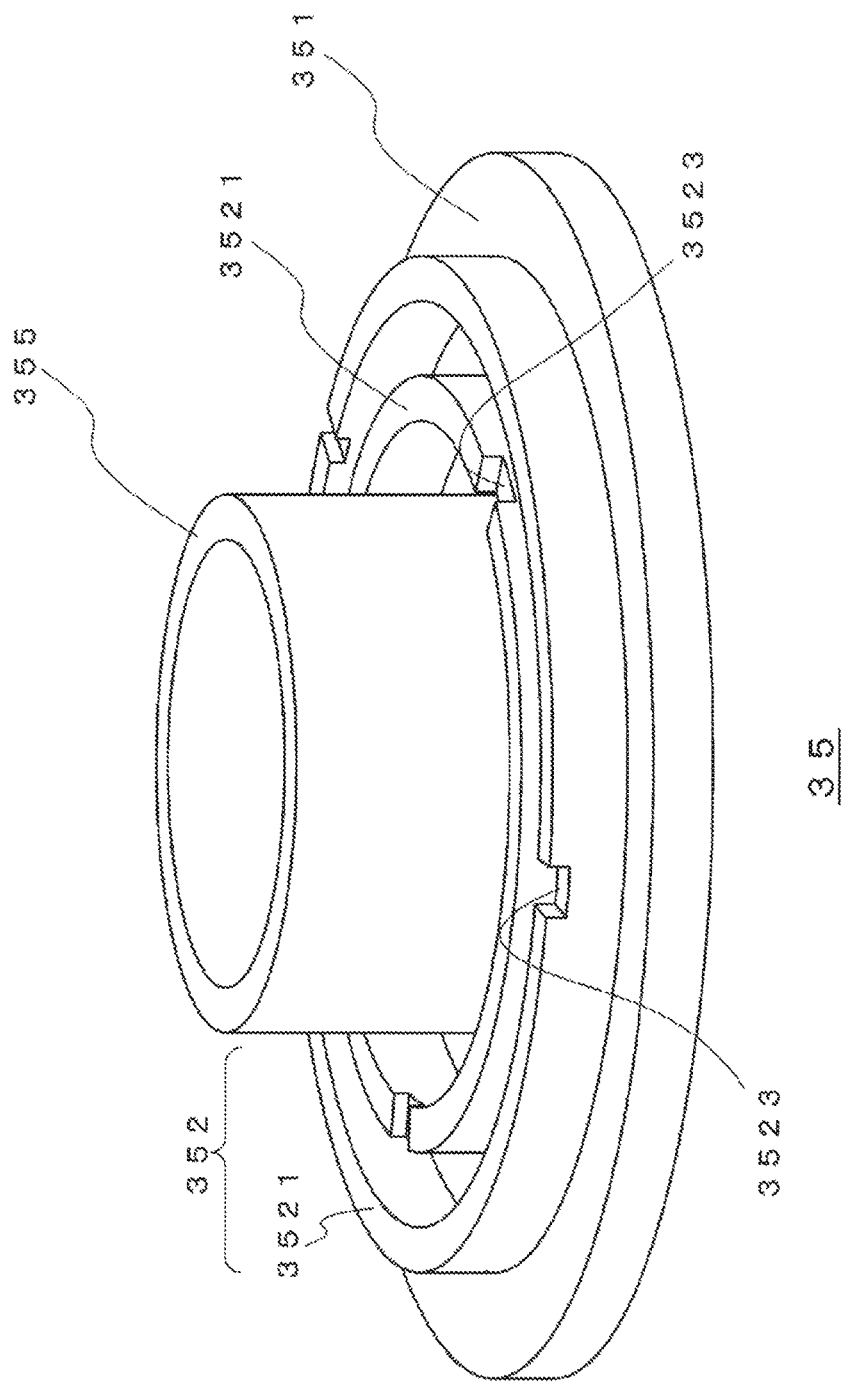
FIG. 8 is a view of a second embodiment of a front case and a lens holder.

FIG. 8 indicates the second embodiment of the lens holder. In the second embodiment, in the engaging part 352 of the lens holder 35, a projection 3521 is formed surrounding the insertion part 355, for example, in a ring shape and having the insertion part 355 as a center. That is, the engaging part 352 is formed in a projected and recessed shape in a radial direction from the center of the insertion part 355. A distance between the center of the insertion part 355 and the ring-shaped projection 3521 is set different from that between the center of the insertion hole 255 and the ring-shaped projection 2521 formed in the engaging part 252 of the front case 25. By setting the distances in this way, the engaging parts 252 and 352 are engaged with each other by inserting the projection of one of the engaging parts into the projections of the other engaging part.

A conduction groove 3523 is formed in the ring-shaped projection 3521 in the radial direction. One or a plurality of conduction grooves 3523 is formed for each ring-shaped projection 3521.

Also, a case where the conduction groove 3523 is formed in the projection 3521 of the engaging part 352 has been described with reference to FIG. 8. However, a conduction groove may be formed in the radial direction in the projection 2521 of the engaging part 252 in the front case 25. Also, when the conduction grooves are formed in the projection 2521 of the engaging part 252 and the projection 3521 of the engaging part 352, the deterioration of the airtightness of the bonded part and the like can be efficiently prevented as described below.

FIGS. 9(A) and 9(B) are diagrams for describing a state of an assembly when the conduction grooves have been formed. Since a plurality of projections 2521 and 3521 is formed in a ring shape, it is difficult to discharge air remaining between the projections to the outside when the projections 2521 and 3521 are engaged with each other. Therefore, for example, as indicated in FIG. 9(A), it is possible that an air layer remains in the engaged region and the airtightness is deteriorated after the adhesive has cured. However, when the conduction grooves are formed, the air between the projections can be discharged via the conduction grooves in a case where the projections 2521 and 3521 are engaged with each other. Therefore, as indicated in FIG. 9(B), it can be prevented that the air layer remain in the engaged region, and the airtightness can be more certainly ensured. Also, since not only the air but also an extra adhesive moves via the conduction grooves, the adhesive moves to a part for lacking the adhesive.

Therefore, the engaged region is more certainly filled with the adhesive, and the airtightness of the engaged region can be more certainly ensured. In addition, when the conduction groove is formed in the radial direction in the projection 2521 in the engaging part 252 of the front case 25, the air in the engaged region can be more certainly discharged from the engaged region and the adhesive member, which has a role of a filler, can effectively move. Accordingly, the deterioration of the airtightness of the bonded part can be efficiently prevented. In order to clarify the movement of the second embodiment, an example of a case where the conduction grooves are formed side by side in the radial direction is illustrated in FIG. 9(B).

By configuring the lens mounting mechanism as described above, the mounting of the image pickup lens to the front case with the airtightness can be realized while the position deviation is absorbed and the position of the image pickup lens relative to the image sensor is precisely adjusted. The position of the front case may be deviated from an ideal design position with the cumulative tolerance of the mounting. Also, the present technique should not be limited to the above-mentioned embodiments of the technique and understood. In the embodiments of the technique, the present technique is disclosed in an example. It is obvious that those skilled in the art can modify and substitute the embodiment without departing from the scope of the present technique. That is, claims should be considered in order to determine the scope of the present technique.

The lens mounting mechanism of the present technique can also have a configuration below.

(1) A lens mounting mechanism comprising:
a lens holder configured to hold an image pickup lens; and
a case configured to have an insertion hole, in which the lens holder is inserted, formed in the case, wherein
an insertion part for being inserted into the insertion hole of the case in an insertion direction which is an optical axis direction of the image pickup lens and a regulation part for regulating the insertion are formed in the lens holder,
engaging parts are provided on a surface opposed to the case of the regulation part of the lens holder and a surface opposed to the regulation part of the case, and
the engaging parts are formed so that the position of the lens holder relative to the case can be adjusted in a state where the engaging part on the surface opposed to the case and the engaging part on the surface opposed to the regulation part are engaged with each other.

(2) The lens mounting mechanism according to (1), wherein
the engaging part on the surface opposed to the case has one or more projections formed therein surrounding the insertion part, and the engaging part on the surface opposed to the regulation part has one or more projections formed therein surrounding the insertion hole, and then, the projections of one engaging part are inserted between the projections of the other engaging part so that the engaging parts are engaged with each other, and
an interval of the projections of the engaging part on the surface opposed to the case is formed wider than that of the projections of the engaging part on the surface opposed to the regulation part, and an interval of the projections of the engaging part on the surface opposed to the regulation part is formed wider than that of the projections of the engaging part on the surface opposed to the case.

(3) The lens mounting mechanism according to (2), wherein
a conduction groove is provided in the projection in a radial direction.

(4) The lens mounting mechanism according to any of (1) to (3), wherein
the engaging part on the surface opposed to the case and the engaging part on the surface opposed to the regulation part are bonded to each other in an engaging state where the lens holder is positioned at a desired position.

(5) The lens mounting mechanism according to (4), wherein
the engaging part on the surface opposed to the case and the engaging part on the surface opposed to the regulation part are bonded to each other in a state where a space between the engaging parts is filled with an adhesive member.

INDUSTRIAL APPLICABILITY

In the lens mounting mechanism, the lens mounting method, and the image pickup device according to this technique, the insertion part which is inserted into the insertion hole of the case in the insertion direction which is the optical axis direction of the image pickup lens and the regulation part for regulating the insertion are formed in the lens holder for holding the image pickup lens. Also, the insertion hole is formed in a case to which the lens holder is mounted. The lens holder is inserted into the insertion hole. The engaging parts are provided on the surface opposed to the case of the regulation part of the lens holder and on the surface opposed to the regulation part of the case. The engaging parts are formed so that the position of the lens holder relative to the case can be adjusted in a state where the engaging part on the surface opposed to the case and the engaging part on the surface opposed to the regulation part are engaged with each other. Therefore, when the engaging part of the lens holder and that of the case are engaged and the lens holder is fixed to the case, the image pickup lens can be precisely mounted at a desired position with the airtightness. Therefore, the image pickup device according to this technique is suitable for an electronic device, for example, an image pickup device and the like for vehicle. It is necessary for the electronic device to have an imaging function and the airtightness.

REFERENCE SIGNS LIST 10, 11 image pickup device
21, 25 front case 22, 26 rear case
31 image pickup lens
32, 35 lens holder
41 O-ring
51 image sensor
52, 53 substrate
54 connector
55 substrate mounting part
56 wiring member
211, 251 front part
212, 255 insertion hole
213 annular recess
251a surface opposed to the regulation part
252, 352 engaging part
351 regulation part
351a surface opposed to the front case
321, 355 insertion part
322, 356 lens mounting support
2521, 3521 projection
3523 conduction groove
3551 bottom surface

The invention claimed is:

1. A camera module system for a vehicle, the camera module system comprising:
   a lens holder configured to mount a lens, the lens holder having a first surface that is perpendicular to an optical axis of the lens;
   a case configured to mount the lens holder, the case having a second surface that faces the first surface;
   a first engaging part on the first surface, the first engaging part including a plurality of first projections; and
   a second engaging part on the second surface, the second engaging part including a plurality of second projections,
   wherein a first interval of the plurality of first projections is wider than a first width of one of the plurality of second projections,
   wherein a second interval of the plurality of second projections is wider than a second width of one of the plurality of first projections, and
   wherein the first engaging part is engaged with the second engaging part when the plurality of first projections is engaged with the plurality of second projections.

2. The camera module system according to claim 1, wherein the case has an inner surface and an outer surface, and wherein the plurality of second projections is formed on the inner surface.

3. The camera module system according to claim 2, wherein the case defines an insertion aperture, and wherein a portion of the lens holder is inserted into the insertion aperture.

4. The camera module system according to claim 1, wherein the plurality of first projections has a ring shape from a view in a direction of the optical axis.

5. The camera module system according to claim 1, wherein the plurality of second projections has a ring shape from a view in a direction of the optical axis.

6. The camera module system according to claim 1, wherein the plurality of first projections includes a conduction groove.

7. The camera module system according to claim 1, further comprising an adhesive configured to bond the first engaging part to the second engaging part.

8. An image pickup device comprising:
   a lens holder configured to mount a lens, the lens holder having a first surface that is perpendicular to an optical axis of the lens;
   a case configured to mount the lens holder, the case having a second surface that faces the first surface;
   a first engaging part on the first surface, the first engaging part including a plurality of first projections; and
   a second engaging part on the second surface, the second engaging part including a plurality of second projections,
   wherein a first interval of the plurality of first projections is wider than a first width of one of the plurality of second projections,
   wherein a second interval of the plurality of second projections is wider than a second width of one of the plurality of first projections, and
   wherein the first engaging part is engaged with the second engaging part when the plurality of first projections is engaged with the plurality of second projections.

9. The image pickup device according to claim 8, wherein the case has an inner surface and an outer surface, and wherein the plurality of second projections is formed on the inner surface.

10. The image pickup device according to claim 9, wherein the case defines an insertion aperture, and wherein a portion of the lens holder is inserted into the insertion aperture.

11. The image pickup device according to claim 8, wherein the plurality of first projections has a ring shape from a view in a direction of the optical axis.

12. The image pickup device according to claim 8, wherein the plurality of second projections has a ring shape from a view in a direction of the optical axis.

13. The image pickup device according to claim 8, wherein the plurality of first projections includes a conduction groove.

14. The image pickup device according to claim 8, further comprising an adhesive configured to bond the first engaging part to the second engaging part.

15. A method comprising:
   providing a lens holder configured to hold a lens, wherein the lens holder has a first surface that is perpendicular to an optical axis of the lens and a first engaging part on the first surface, the first engaging part including a plurality of first projections;
   providing a case having a second surface and a second engaging part on the second surface, the second engaging part including a plurality of second projections, wherein a first interval of the plurality of first projections is wider than a first width of one of the plurality of second projections, and wherein a second interval of the plurality of second projections is wider than a second width of one of the plurality of first projections; and
   engaging the plurality of first projections with the plurality of second projections.

16. The method according to claim 15, wherein providing the case having the second surface and the second engaging part on the second surface further includes providing the case having an inner surface and an outer surface, and wherein the inner surface is the second surface.

17. The method according to claim 16, further comprising inserting a portion of the lens holder into an insertion aperture, wherein the insertion aperture is defined by the case.

18. The method according to claim 15, wherein the plurality of first projections has a first ring shape from a view in a direction of the optical axis.

19. The method according to claim 15, wherein the plurality of first projections includes a conduction groove.

20. The method according to claim 15, further comprising providing an adhesive by filling a space between the first engaging part and the second engaging part with the adhesive to bond the first engaging part to the second engaging part.

\* \* \* \* \*